United States Patent
Cordery et al.

[11] Patent Number: 5,974,147
[45] Date of Patent: Oct. 26, 1999

[54] METHOD OF VERIFYING UNREADABLE INDICIA FOR AN INFORMATION-BASED INDICIA PROGRAM

[75] Inventors: Robert A. Cordery, Danbury; Richard W. Heiden, Shelton; Leon A. Pintsov, West Hartford; Brian M. Romansky, Stamford; Monroe A. Weiant, Trumbull, all of Conn.

[73] Assignee: Pitney Bowes Inc., Stamford, Conn.

[21] Appl. No.: 08/743,972

[22] Filed: Nov. 7, 1996

[51] Int. Cl.$^6$ .................................. H04K 1/00; G06K 9/00
[52] U.S. Cl. ........................ 380/25; 705/401; 705/410; 382/101; 382/102; 382/112; 382/310
[58] Field of Search .............................. 380/51; 705/400, 705/410; 382/101, 102, 112, 310

[56] References Cited

U.S. PATENT DOCUMENTS

| | | | |
|---|---|---|---|
| 4,775,246 | 10/1988 | Edelmann et al. | 380/51 |
| 4,775,537 | 10/1988 | Edelmann et al. | 380/51 |
| 5,675,650 | 10/1997 | Cordery et al. | 380/51 |
| 5,862,243 | 1/1999 | Baker et al. | 382/101 |

*Primary Examiner*—Gail O. Hayes
*Assistant Examiner*—Bryan Latham
*Attorney, Agent, or Firm*—Charles R. Malandra, Jr.; Melvin J. Scolnick

[57] ABSTRACT

The present invention provides a method for verifying an unreadable information-based indium that has been generated by a postal security device (PSD) for information-based indium comprising a 2-D bar code, certain human-readable information, a digital signature and a certificate. The method comprises the steps of attempting to read the 2-D bar code using sophisticated digital image processing when the 2-D bar code is not readable; and continuing normal processing when the 2-D bar code is readable with the sophisticated digital image processing. When the 2-D bar code is not readable two independent processes are used to determine the indicium certificate. A first process includes reading human readable information by optical character recognition using context, syntax, and redundancy in the human readable information to obtain a PSD-ID; and using the PSD-ID to look up in a certificate database a certificate corresponding to the information-based indicium. A second process includes interpreting partial bar code data and extracting a "best guess" of the certificate and searching the certificate database for the closest matching certificate. The method further comprises merging data obtained from the two processes and attempting to reconstruct bar code data from the merged data. If the merged data is sufficient, an attempt is made to verify the digital signature obtained from the merged data. If the signature is verified, normal processing is resumed. If the merged data is insufficient or if the signature is not verified, a suspect mailpiece record is created.

24 Claims, 4 Drawing Sheets

METHOD OF VERIFYING UNREADABLE INDICIA FOR AN INFORMATION-BASED INDICIA PROGRAM

FIELD OF THE INVENTION

The present invention relates generally to a method for verifying indicia and, more particularly, to such method for verifying information-based indicia.

BACKGROUND OF THE INVENTION

The Information-Based Indicia Program (IBIP) is a distributed trusted system proposed by the United States Postal Service (USPS). The IBIP requires printing large, high density, two dimensional (2-D) bar codes on mailpieces. The Postal Service expects the IBIP to provide cost-effective assurance of postage payment for each mailpiece processed. However, such assurance will only be as good as the verification process within the IBIP.

The vast majority of the Posts around the world demand prepayment for postal services. This allows the Posts to avoid the substantial costs associated with collecting, processing and distributing billing data, as well as costs of remittance processing and collection for billions of mailers. Prepayment, however, necessitates that individual mailpieces carry verifiable evidence of paid postage. The familiar postage stamp is a prime example of such evidence. Although postage stamps are good for many applications they suffer from shortcomings. They are costly to produce and distribute and are subject to theft. For moderate to larger volume mailings postage stamps are difficult to apply and slow the process. Further, stamps do not provide information such as date and place of mailing and provide limited postal revenue security.

Arthur Pitney invented the first postage meter in 1902 to alleviate some shortcomings of postage stamps. The postage meter was a mechanical device with securely coupled printing and accounting functions. The mechanical meter, perfected over the years, became a widespread basic business machine; many are still in service. The accounting and machine control functions were computerized in the late seventies, after the invention of the microprocessor. This enabled new features, including departmental accounting and computerized meter resetting. The fundamental security of postage evidencing remained the same.

Postal revenue security in the analog postage meter depends on two features: (a) physical security of the printing process, i.e., printing of postage evidence can not occur without appropriate accounting, and (b) forensic detectability, i.e., fraudulent postal indicia can be distinguished from legitimate indicia.

Coupling the printing and accounting mechanism within a secure tamper evident device provides physical security of printing. Inspection of the device normally reveals tampering. The effectiveness of forensic detectability of fraudulent postal indicia depends on non-availability of alternative mechanisms suitable for forging indicia. Before the proliferation of inexpensive, high print quality computer-driven digital printers, serious attempts to generate fraudulent indicia using an alternate printing mechanism were detectable.

Recent availability of inexpensive computer-driven printers provides opportunities for customer convenience and cost advantages for printing postage evidence. This requires a new way of securing postage, such as disclosed in U.S. Pat. Nos. 4,641,347, 4,641,346, 4,757,537, and 4,775,246, which provide that the security of postage evidencing depends on the security of the information printed in the indicium, including message authentication and integrity. This idea is extended to unsecured printing of postage as disclosed in U.S. Pat. Nos. 4,831,555 and 4,725,718, which provide that at least some of the information in the indicium must appear random to a party not in possession of some secret. This random looking information is referred to as a digital token.

The basis of postal revenue security in the digital printing world is two new requirements: (a) security of the digital token generating process, i.e., digital tokens can not be generated without appropriate accounting, and (b) automatic detectability, i.e., fraudulent digital tokens can be detected by automatic means.

A cryptographic transformation applied to data appearing in the indicium produces the digital token. The data elements, referred to as input postal data or simply postal data, may include postage value, date, register values, postal code of the geographical deposit area, recipient address information and piece count. The secret used to generate the token is generally a cryptographic key held within the device. The digital token is validated, i.e., verification that accounting for the postage value printed in the indicium has been properly done, by a verifier with access to a key matching the accounting device secret. Several cryptographic algorithms and protocols have been considered for this purpose. U.S. Pat. No. 4,853,961 describes critical aspects of using public key cryptography for mailing applications.

Verification of Information-Based Indicia (IBI) indicia is the process of proving that the postage evidenced on each IBI mailpiece has been paid. The digital signature scheme proposed for the IBI system provides a secure method of proving the validity, specifically the integrity and authenticity, of the data within the indicium. However, this capability alone does not rule out all potential fraud attempts. A thorough verification system must account for cases where the indicium bar code is unreadable and must be able to detect duplicate mailpieces.

The generation of unreadable indicia bar codes is an attractive method of fraud. This attack circumvents the cryptographic security and tracking features of the IBI system. However, due to the difficulties inherent in printing large, high density, 2-D bar codes on mail it is likely that many honest mailers will also print a significant number of unreadable, but legitimate mailpieces. Thus, since there will probably be a large volume of such pieces, unreadable mail cannot arbitrarily be returned to the sender, nor can it automatically be suspected of fraud. Therefore, every effort must be made to correctly read as many mailpieces as possible.

Duplicate mailpieces pose another serious threat. For cases where the indicium does not involve destination address information, there is no relationship between the indicium data and a particular mailpiece, so a simple copy of an indicium will produce multiple mailpieces with cryptographically valid indicia. The only defense against this attack is to maintain a database of mailpieces at each mail processing facility. For computer-based systems, the destination address is cryptographically tied to the indicium data; thus, the potential benefit of a simple copy attack is limited. However, enforcement of this cryptographic link requires that the destination postal code specified in the indicium is the same as the address to which the mailpiece is actually delivered. This requires that the machine readable and human readable address information be checked to ensure that they agree with the destination address specified in each indicia.

Another complication with duplicate indicia is the determination of which mailpiece is legitimate and which is the fraud. While in some cases a mailer may naively copy indicia from his or her own postal security device (PSD), it is more likely that a sophisticated attacker will copy indicia data from other mailpieces. In these cases the verification system cannot necessarily determine which mailpiece is fraudulent, but it must make an effort to record sufficient mailpiece information for investigators to pursue the culprit.

SUMMARY OF THE INVENTION

If the data in an indicium is unreadable, the validity of the indicium cannot be verified, and any special services requested and paid for by the mailer cannot be performed. This situation also presents the potential for either fraud or the effective loss of postal customer funds. In an attempt to minimize these effects, every attempt must be made to ensure accurate reading of the indicium data. It has been found that the information in an IBI indicium that is unreadable in a normal verification process, may be determined in accordance with the present invention. Such "reading" of unreadable indicia is aided by the significant redundancy naturally occurring within the indicium.

The present invention provides a method for verifying an unreadable information-based indicium generated by a postal security device (PSD) for an information-based indium comprising a 2-D bar code, certain human-readable information, a digital signature and a certificate. The method comprises the steps of attempting to read the 2-D bar code using sophisticated digital image processing when the 2-D bar code is not readable during normal processing; and continuing normal processing when the 2-D bar code is readable with the sophisticated digital image processing. When the 2-D bar code is still not readable two independent processes are used to determine the indicium certificate. A first process includes reading human readable information by optical character recognition using context, syntax, and redundancy in the human readable information to obtain an identification number of the PSD (PSD-ID); and using the PSD-ID to look up in a certificate database a certificate corresponding to the information-based indicium. A second process includes interpreting partial bar code data and extracting a "best guess" of the certificate. Computing a hash of the best guess provides a preferred method of searching the certificate database for the closest matching certificate. The method further comprises merging data obtained from the two processes and attempting to reconstruct bar code data from the merged data. Error correction code can handle more errors in the variable bar code data if the errors in the fixed data are corrected by reference to an external source. If the merged data is sufficient, an attempt is made to verify the digital signature obtained from the merged data. If the signature is verified, normal processing is resumed. If the merged data is insufficient or if the signature is not verified, a suspect mailpiece record is created.

The above and other objects and advantages of the present invention will be apparent upon consideration of the following detailed description, taken in conjunction with accompanying drawings, in which like reference characters refer to like parts throughout, and in which:

DETAILED DESCRIPTION OF THE PRESENT INVENTION

Figure 1:
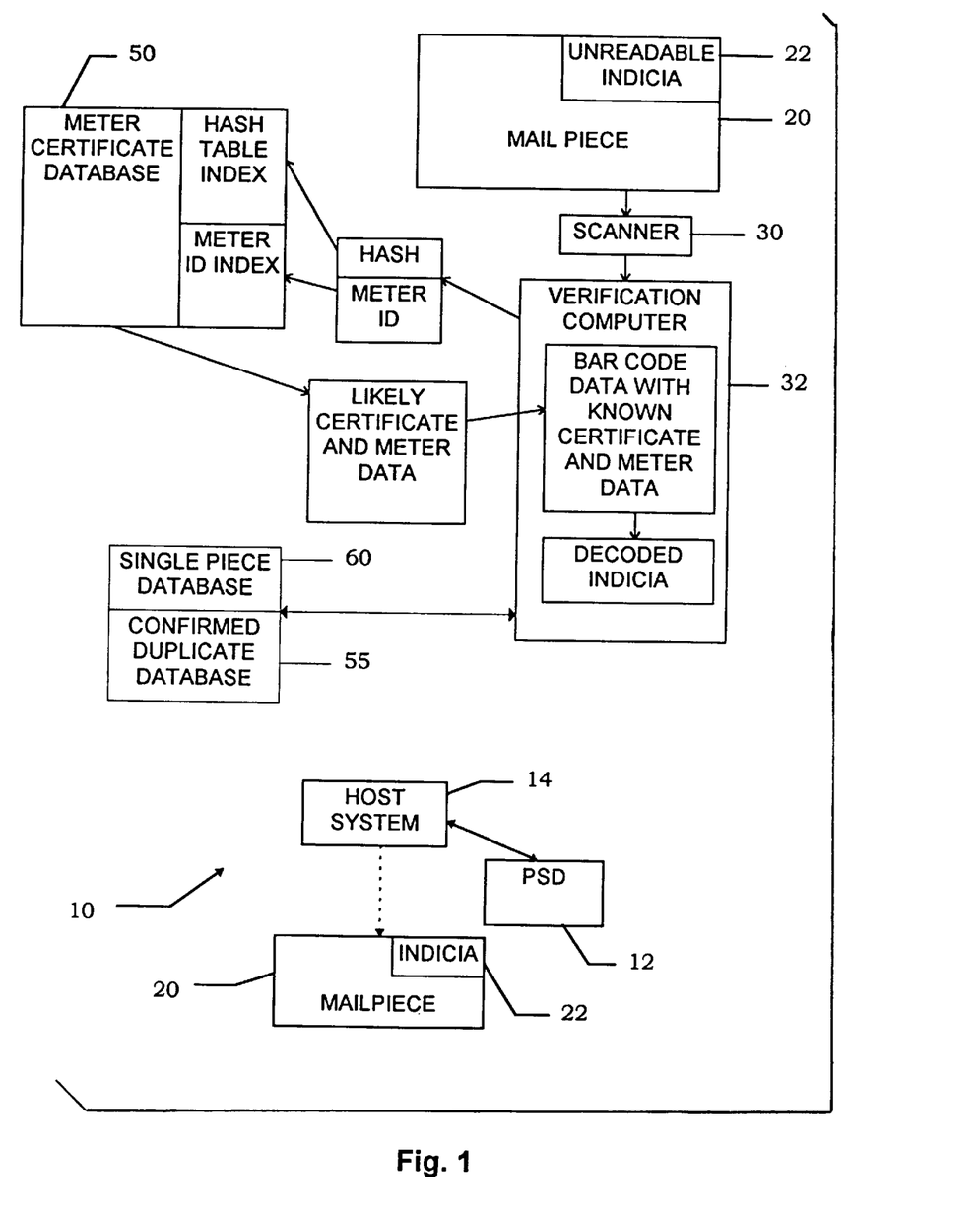
FIG. 1 is a block diagram of a postage evidencing and verification system in which the present invention may be performed.

In describing the present invention, reference is made to the drawings, wherein there is seen in FIG. 1 a block diagram of a postage evidencing and verification system in which the present invention may be performed. The postage evidencing part of the system, generally designated 10, comprises a Postal Security Device (PSD) 12 coupled to a host system 14, which may be a host computer system or a postage meter. The PSD 12 provides security services to support the creation of a new information-based postage postmark or indicium 22 that will be applied to a mailpiece 20 being processed using the IBIP. The processing of mailpiece 20 includes a verification of indicium 22 which comprises a 2-D bar code and human readable information. Such verification comprises reading indicia data from mailpiece 20 and verifying that indicium 22 is valid.

The verification part of the system includes a scanner 30 coupled to a verification computer 32 which may be located remotely from scanner 30. Verification computer 32 is coupled to a meter certificate database 50 which has stored therein certificates of all meters active within the system. In an alternate embodiment, meter certificate database 50 is a regional or local database that has stored therein certificates of all meters active in the region or local area that the verification computer is authorized to perform verification. Verification computer 32 is also coupled to a database of confirmed duplicates 55 and a single piece database 60. The confirmed duplicates database 55 is a database in which all detected duplicate indicia are stored. The single piece database 60 is a database of each indicium processed by the verification computer 32 or similar verification computers in other areas.

For normal mailpiece flow, there are two possible verification processes, i.e., Statistical Sampling and Total Verification, each having different capabilities for detecting fraud. In Statistical Sampling, the mail stream is sampled at a predetermined and possibly variable rate. The indicia on the sampled mailpieces are verified. Computers, such as laptop computers, will use the data from the scanner to carry out verification of cryptographic integrity of the indicium based on the certificate nested in the indicium. Integrity of a USPS Certificate Authority (CA) public key and a Certificate Revocation List (CRL) list are assumed to be guaranteed procedurally, rather than by means of a secure hardware module. If the sampling rate continues at a typical USPS rate of 30,000 pieces daily, a person attempting fraud by non-readable indicia or by copies is not likely to be detected until a large number of fraudulent mailpieces have been produced. Detection of either of these fraud attempts depends on accumulating the verification data in a central database and then checking mailpiece data against this database, presumably off-line. In most respects, the verification flow for both Statistical Sampling and Total Verification is similar. Thus, the following discussion provides details for Total Verification with the understanding that they also generally apply to Statistical Sampling.

Figure 2:
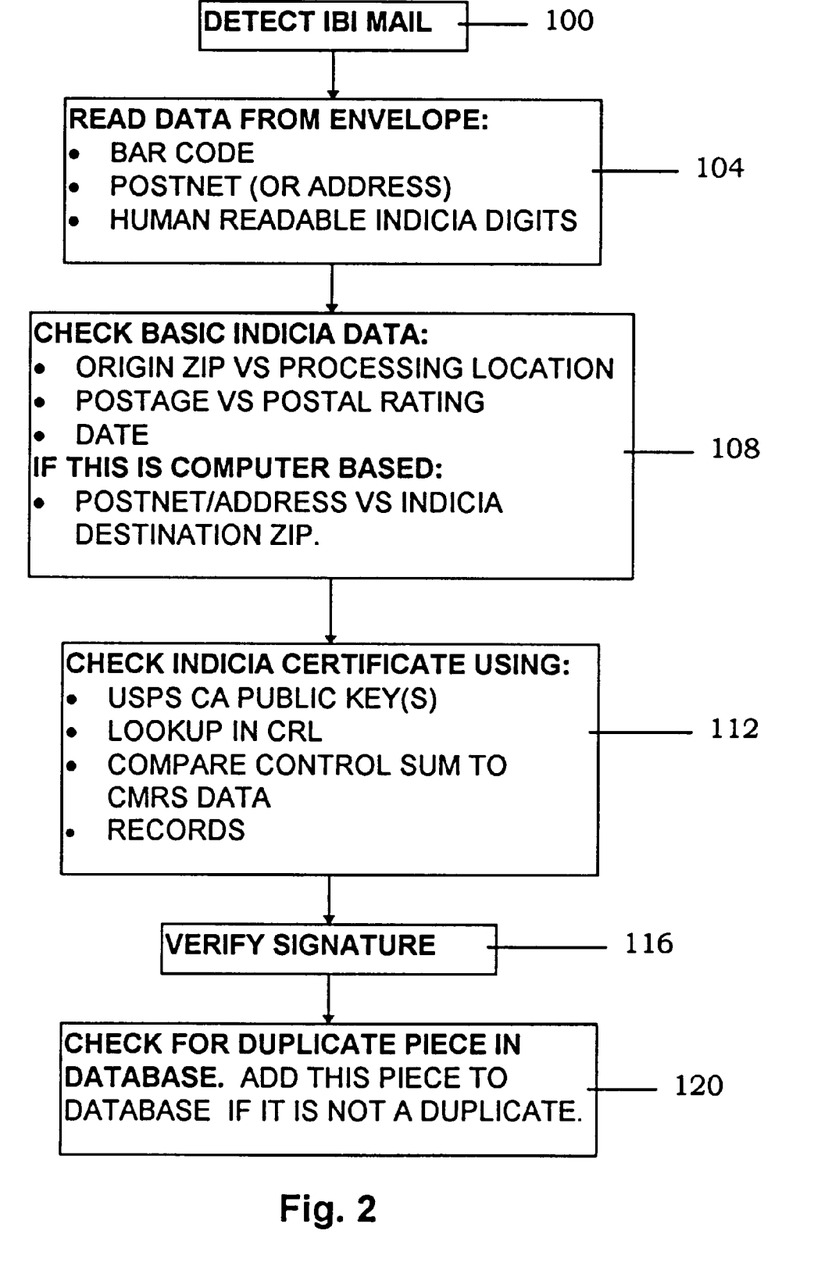
FIG. 2 is a flow chart of the normal information-based indicia verification process.

Referring now to FIG. 2, the IBI Total Verification process for verifiable mailpieces is shown. At step 100, IBI mail is detected and separated from the rest of the mail stream for special processing. This can be accomplished by a facer canceler using the unique Facing Identification Mark (FIM) assigned to the IBI indicium. The bar code in an IBI indicium may also be identified by the unique optical features of a 2-D bar code. At step 104, the indicium data that will be verified is read from the envelope into a computer. The information required for verification includes the 2-D bar code, the PostNet version of the bar code, or the human readable address (if there is no PostNet present), and the human readable digits in the indicium. The address information is required to ensure that the delivery point address on the mailpiece agrees with the delivery point bar code securely printed in the indicium. The human readable digits in the indicium must be read to ensure that this information also agrees with the barcode data in the indicium. Both of these checks are required to ensure that duplicate bar codes are not used with multiple addresses and that a bar code containing a low postage value is not used with a higher human readable postage value. The latter would avoid the suspicion of postal employees, who can only check the human readable version.

At step 108, a basic check of the indicium data can detect obvious or unsophisticated attempts at fraud. For example, according to postal regulations, the origin postal code in the indicium must be one of the limited set of regions that are allowed to submit metered mail to the processing location where the mail is being examined. In addition, the postage value must agree with the postal rating specified in the bar code. A simple check can also ensure that the date printed in the indicium agrees with the actual date of submission of the mailpiece. Finally, if the indicium is from a computer-based meter, the address to which the mailpiece will be delivered must agree with the destination point postal code in the indicium.

At step 112, the validity of the indicium certificate must be verified with a trusted copy of the USPS public key. The meter certificate must also be checked against a Certificate Revocation List (CRL) to ensure that it has not been revoked. Finally, the checksum of the ascending and descending registers printed in the indicium can be checked against the value recorded by a computerized meter reset system (CMRS) system during the most recent refill of the meter. Once the indicium certificate has been verified, the signature of the indicium data can then be verified, at step 116, to ensure the authenticity and integrity of the data that it contains. At step 120, an additional check must be made to ensure that the indicium is not a duplicate. This is particularly important for non-computer-based indicia where the indicium data is not tied to the destination address. The check for duplicate indicia is describe below.

Unreadable Indicia

If the Post cannot read an indicium, it cannot validate the indicium data, and cannot perform services for which the mailer paid and requested. This situation presents the potential for either fraud or the effective loss of postal customer funds. In an attempt to minimize these effects, every attempt must be made to ensure accurate reading of the indicium data. It has been found that this requirement is aided by the fact that there is significant redundancy naturally occurring within the indicium. In particular, there is a large part of the fixed data that is available from an external source.

Figure 3:
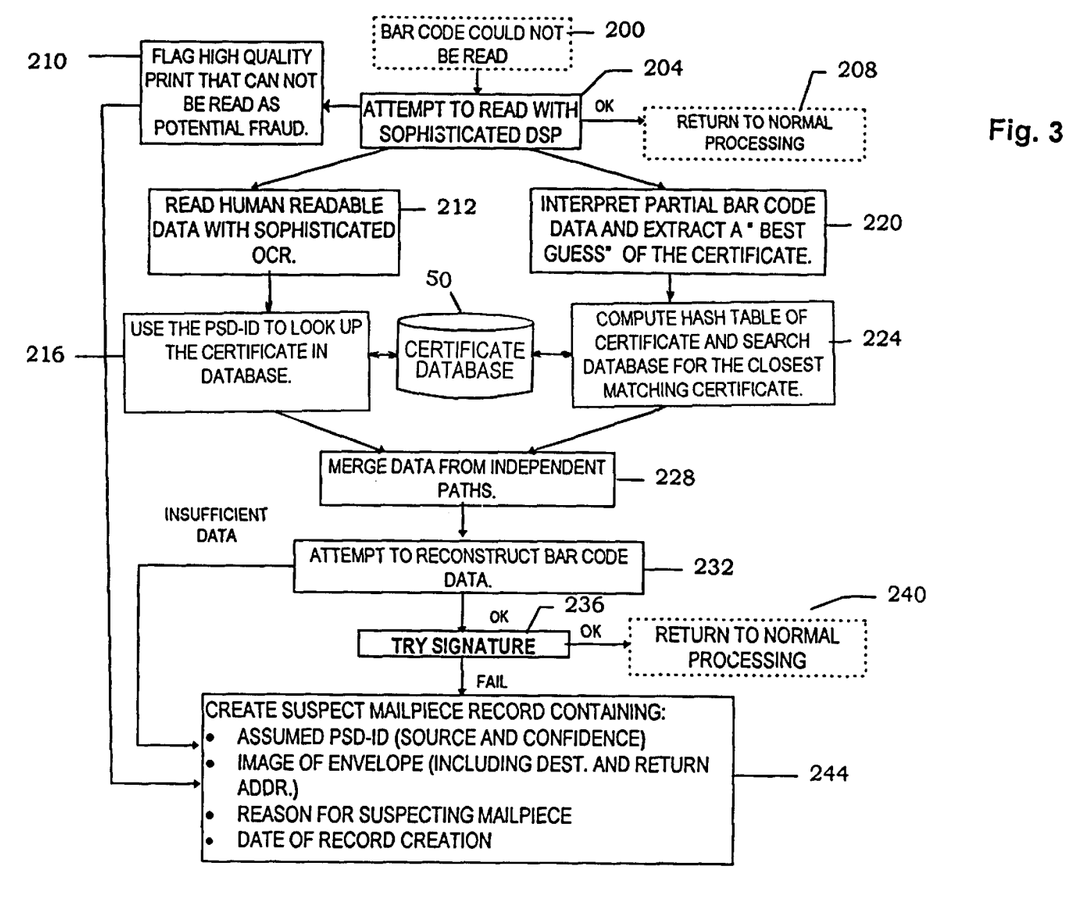
FIG. 3 is a flow chart of the method of processing unreadable information-based indicia in accordance with the present invention.

Two-dimensional bar codes contain a significant amount of redundancy that can be used to aid in reading damaged or distorted bar codes. The majority of redundant data is in the form of carefully selected error correction bits, which can aid in repairing damaged portions of a symbol. However, for error correction techniques to work, some minimal fraction of valid bar code data must be available. For a badly damaged mailpiece, the amount of readable data may not meet this minimum threshold, but a large amount of the bar code data is available from other sources. In particular, the certificate contained within an IBI indicium represents, for example, approximately 60% of the bar code data for an RSA certificate, and 64% of the bar code data for a DSS certificate. If the certificate can be obtained from an external source, a large amount of the bar code bits will be known and the error correction bits can then be used to effectively correct for the remaining unknown data. Since indicium certificates are a fixed parameter for an extended period of the life of a meter, they can be stored in a database and retrieved with a pointer. One potential pointer is the human readable PSD-ID printed in every indicium. Another way to locate a certificate is to choose the one that best matches some partial data that can be read from an indicium bar code. FIG. 3 outlines a process for exploiting these mechanisms.

Referring now to FIG. 3, the processing of unreadable indicia is shown. At step 200, if an indicium can not be read by the normal process shown in FIG. 2, an attempt is made, at step 204, to read its bar code using sophisticated Digital Signal Processing (DSP) techniques. This processing will most likely take more time and computer resources than the normal bar code reading equipment can afford, so it must be performed outside the normal processing stream; however, it may be completely automated. Advanced processing can take advantage of symmetries and redundancies within a 2-D bar code that are overlooked by normal bar code processing. In addition, time-consuming image-processing operations may be performed to improve the ability to read the data. If this advanced processing is able to read the bar code, the mailpiece can be returned, at step 208, to the normal processing flow. If the advanced algorithms cannot read the data, a further decision must be made based on the quality of the printing of the indicium. It is certainly possible that a badly damaged or distorted bar code could be unreadable even with advanced DSP algorithms. However, image processing measurements of attributes such as the sharpness of edges, the alignment of edges, and the sizes of bar code modules could indicate that a particular indicium was printed with very high quality and yet remains unreadable. This situation may indicate a case of fraud where the attacker intentionally printed random bar code data that would be unreadable by any algorithm, but printed the data with a high quality printer in order to avoid the suspicion of letter carriers. Such pieces should be automatically suspected as fraud attempts.

The human readable PSD-ID in an indicium may be used to look up the indicium certificate in a database. At step 212, sophisticated optical character recognition (OCR) methods can be used to read this information from the indicium. Any available context, syntax, or redundancy in the PSD-ID values should be used in this process. This should include the human readable origin postal code printed in the indicium, which must agree with the postal area in which the PSD is registered. Alternatively, an operator can enter the data manually.

At step 216, using the PSD-ID read from the human readable portion of the indicium, an associated certificate may be read from certificate database 50. Most OCR algorithms can provide several guesses for the identity of each character read. If the first choice characters reported by the OCR software do not match an existing PSD-ID, the second or third choice values can be used to obtain a valid PSD-ID value. In addition, the origin ZIP code read by the OCR system can be used in this process to ensure that the correct PSD-ID is identified even in the presence of OCR errors.

The PSD-ID itself may contain redundant information, such as error correction and detection code, manifested as two or three additional digits. In this case, OCR reading of the PSD-ID is greatly enhanced.

At step 220, an second method of identifying the certificate for a specific indicium is finding the certificate that best matches the data in the indicium. This requires extracting partial data from the bar code without applying error correction. The portion of the bar code bits that represent the indicium certificate will represent the best guess of the actual indicium certificate, although it is likely to contain several bit errors. This bit pattern can be used to locate the best matching certificate in the database 50 of known PSD certificates. For example, hashing algorithms exist that can efficiently match a binary pattern to a "best fit" pattern in a database. See, for example, THE ART OF COMPUTER PROGRAMMING, Volume 3, Sorting and Searching, by Donald E. Knuth (Addison-Wesley 1973). Such an algorithm is used, at step 224, to match the best guess of the indicium certificate to the best match in the database. Since the certificate contains a large number of bits, there will be significant variety between the binary patterns of differing certificates. Thus, a good match between a best guess certificate read from a mailpiece and a certificate in the database represents a high probability that the correct certificate has been located.

At step 228, it is possible that two certificates have been obtained from the database using the independent methods described in steps 212 through 224. In cases where these certificates differ, a decision must be made to determine which version to use. This decision should be based on the reliability of each method. For example, the OCR processing may report low confidence in the characters recognized or the hashing algorithm may report a poor match for the best choice certificate in the database. These factors must be used to select one certificate for further processing.

Now that a single indicium certificate has been identified, at step 228, for the mailpiece in question, an attempt can be made at reconstructing the bar code data at step 232. As noted previously, 2-D bar codes utilize error correction bits that require a fraction of the bar code data be known to correct errors in the rest of the symbol. At this point in the processing flow, the certificate contained in the bar code is believed to be known; therefore, the data bits from the certificate can be corrected in the raw bar code data and error correction digits can be used to correct the remaining unknown data. Since the certificate represents, as previously noted, approximately 60% of the bar code data for an RSA certificate and 64% of the bar code data for a DSS certificate, this process is likely to allow reliable reading of the remaining data. In cases where the error correction digits are still unable to solve for the remaining bits in the bar code, the mailpiece must be suspected of fraud and the processing proceeds to step 244.

If the unknown bar code data was corrected in step 232, an attempt can be made to verify the digital signature in the indicium at step 236. If this process succeeds, the mailpiece can be returned to normal processing at step 240. Otherwise, it should be strongly suspected as fraudulent.

Mailpieces suspected as fraudulent will require further investigation before the attacker can be prosecuted. In this particular case, there is no reliable data that could be read from the indicium itself. At step 244, any available information on the mailpiece should be stored to a database of suspected fraudulent mailpieces. This database should include an image of the face of the mailpiece to ensure that the destination and return addresses can be read during an investigation. In addition, any assumed data about the indicium should also be stored.

Duplicate Detection and Processing

Figure 4:
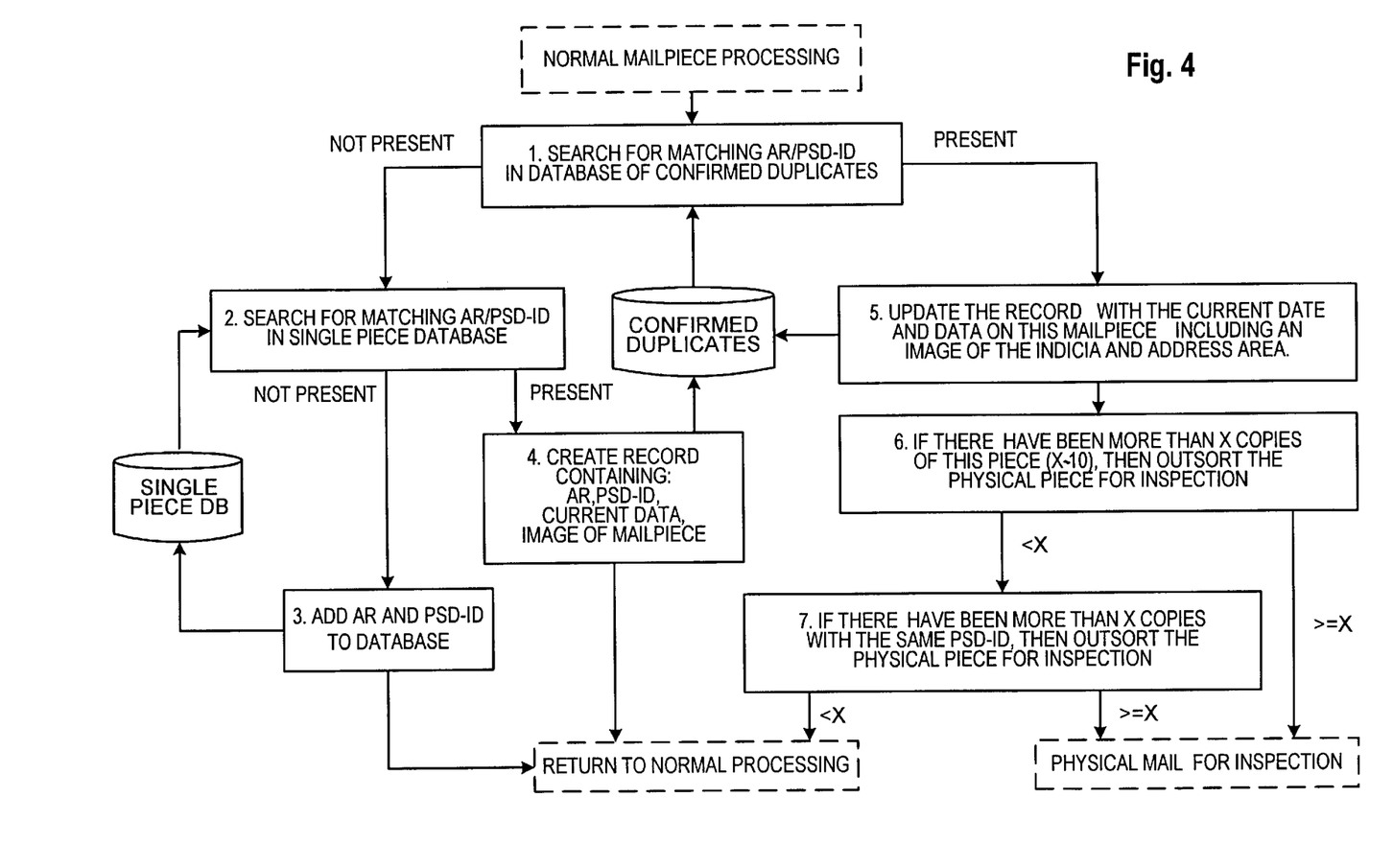
FIG. 4 is a flow chart of the method of detection and classification of duplicate indicia.

Duplicate detection, previously noted in step 120 of FIG. 2, is another step in the verification process that requires complex processing. Referring now to FIG. 4, a method for detection and classification of duplicate indicia addresses two types of duplicates: multiple copies of the same indicium, and many instances of a small number of copies from the same PSD-ID.

A database of confirmed duplicates 55 must be maintained to track indicia that have already been examined at least twice. This database is expected to be much smaller than the database of mailpieces that have been processed only once. As part of the normal mailpiece processing, at step 300, each new mailpiece is first checked to determine if its indicia data has already suspect of fraud. At step 304, the ascending register (AR) and the PSD-ID, which form a unique number that identifies each mailpiece, is searched in the database of confirmed duplicates. If the indicium data does not match anything in the database, a search is conducted, at step 308, in a single piece database 60 to determine if the indicium data has been processed at least once. The single piece database 60 contains a list of all IBI mailpieces handled by a single processing center within a narrow window of valid submission dates. The size of the database can be limited to one mail processing center if the current restriction that mail from a single postage meter can be submitted only to the post office to which it is registered, and the assumption that the mail will be verified at this induction point. However, for Statistical Sampling the mail will probably be checked at the destination, so a nationwide database of one-time verified mailpieces will be necessary.

If the current mailpiece is not in the single mailpiece database 60, it must be added to the database, at step 312, for detection of future duplicates. The mailpiece may then continue on the normal processing flow at step 316.

If the indicium data was identified in the single mailpiece database, it must be added, at step 320, to the database 55 of confirmed duplicates. This record must contain sufficient information for investigators to establish the identity of the creator of the fraudulent piece. The record should include an image of the face of the mailpiece, which will include the destination and the return address along with any other potentially incriminating information.

Mailpieces that contain indicium data that is already in the database of confirmed duplicates must have their database record updated, at step 324, with information on the current mailpiece. At this point it is still unclear which copy of the indicium data is the valid original and there is no way of determining whether the owner of the PSD that created the original is also the creator of the fraudulent copies.

A threshold may be set on the allowable number of copies of a single indicium. If this number is too low, honest mailers may have their mail stopped when attackers make a copy of their indicia. After this threshold has been met, physical mailpieces may be separated, at step 328, for inspection, at step 332.

A separate threshold may be set for the number of copies allowed for each PSD-ID. At step 336, if this threshold has been met, physical mailpieces may be separated for inspection, at step 332. This case will cover a situation such as a mailer or a third party making a single duplicate of many different indicia from a single PSD. As in step 328, once the threshold has been reached, mailpieces may be separated for inspection. If this threshold has not been met, mailpieces are returned to normal processing at step 316.

The duplicate indicia process assumes that each IBI mailpiece passes through the duplicate detection system only once. It is possible that a single legitimate mailpiece will require special handling that may cause it to pass through the system more than once. One method of allowing this is to place a cancellation mark on each piece after processing and ignore pieces that have already been canceled. However, this opens a new fraud attack where the mailer places a copy of the cancellation mark on the mailpiece before it is submitted. In this case, postal authorities may not be able to differentiate between the newly submitted pieces and those that have already been processed. Another fraud attack is copying only uncancelled indicia when statistical sampling is used in the verification process.

The preferred embodiment has been described in relation to postal information-based indicium. It will be understood that the present invention is not limited to postal indicium and can be used in conjunction with any transaction evidencing application using printed indicia.

While the present invention has been disclosed and described with reference to a single embodiment thereof, it will be apparent, as noted above, that variations and modifications may be made therein. It is, thus, intended in the following claims to cover each variation and modification that falls within the true spirit and scope of the present invention.

What is claimed is:

1. A method for verifying in an information-based indicia printed on mailpieces, the method comprising the steps of:
   a) initiating normal processing of the mailpieces;
   b) detecting mailpieces with information-based indicia printed thereon;
   c) scanning the information-based indicium on each of the detected mailpieces to read indicium data contained therein;
   d) determining for each information-based indicium whether the indicium data is readable;
   e) continuing normal processing when the indicium data is readable;
   f) attempting to obtain the indicium data using digital image processing when the indicium data is not readable;
   g) continuing normal processing when the indicium data is obtained by the digital image processing;
   h) using a readable part of the indicium data to obtain a part of the unreadable indicium data from other data sources;
   k) attempting to reconstruct the information-based indicium by merging the readable part of the indicium data with the obtained unreadable part of the indicium data;
   l) identifying the mailpiece as suspect if the merged data is insufficient,;
   m) attempting to verify a digital signature obtained from the reconstructed indicium;
   n) returning to normal processing when the digital signature is verified; and
   o) identifying the mailpiece as suspect when the digital signature cannot be verified.

2. The method of claim 1 wherein the step h comprises the further steps of:
   1) reading human readable information to obtain first information identifying a source of the indicium; and
   2) using the first information to look up in a database second information that is included in the information-based indicium.

3. The method of claim 2 wherein the step h comprises the further steps of:
   3) interpreting partial indicium data and extracting a best guess of the second information;
   4) searching the database for the closest record matching the second information; and
   5) merging data obtained from steps 2 and 4.

4. The method of claim 3 wherein the first information is an indicium certificate.

5. The method of claim 4 wherein the second information is an ID of the device originating the information-based indicium.

6. The method of claim 4 wherein step f comprises the further step of:
   1) flagging potential fraud when high quality print cannot be read.

7. The method of claim 1 wherein the step h comprises the further steps of:
   1) interpreting partial indicium data and extracting a best guess of second information; and
   2) searching a database for the closest record matching the second information.

8. A method for verifying a mailpiece with an unreadable information-based indium that has been generated by a postal security device (PSD), the information-based indium comprising a bar code, certain human-readable information and a digital signature, the method comprising the steps of:
   a) attempting to read the bar code using digital image processing;
   b) continuing normal processing when the bar code is readable by the digital image processing;
   c) when the bar code is not readable,
      1) reading human readable information to obtain a PSD-ID; and
      2) using the PSD-ID to obtain from a database a certificate corresponding to the information-based indicium;
   d) interpreting partial bar code data, and
      1) extracting a best guess of the certificate; and
      2) searching the database for the closest matching certificate;
   e) merging data obtained from steps c.2 and d.2;
   f) attempting to reconstruct bar code data from the merged data;
   g) creating suspect mailpiece record if a digital signature cannot be obtained from the reconstructed bar code;
   h) attempting to verify the obtained digital signature;
   i) returning to normal processing when the obtained digital signature is verified; and
   j) creating suspect mailpiece record when the obtained digital signature cannot be verified.

9. The method of claim 8 wherein the suspect mailpiece record created in steps g and j include an assumed PSD-ID image of envelope, a reason for suspecting the mailpiece and a date of record creation.

10. The method of claim 8 comprising the further step of:
    k) Checking for duplicate mailpiece in database.

11. The method of claim 8 wherein the bar code is a 2-D bar code.

12. A method for verifying mailpieces each having printed thereon an information-based indicium generated by a postal security device (PSD), the information-based indium consisting of a bar code, certain human-readable information and a digital signature, the method comprising the steps of:

a) processing the mailpieces;

b) detecting mailpieces with information-based indicia printed thereon;

c) scanning the information-based indicium printed on each of the detected mailpieces using a bar code reader;

d) determining for each information-based indicium whether the bar code is readable;

e) continuing normal processing when the when the bar code is readable;

f) attempting to determine the bar code using digital image processing when the bar code is not readable;

g) continuing normal processing when the bar code is determined by the digital image processing;

h) when the bar code is not determined, reading human readable information to obtain a PSD-ID;
  1) using the PSD-ID to obtain from a database a certificate corresponding to the information-based indicium;
  2) interpreting partial bar code data and extracting a best guess of the certificate; and
  3) searching the database for the closest matching certificate;

j) merging data obtained from steps h.1 and h.3;

k) attempting to reconstruct bar code data from the merged data;

l) creating suspect mailpiece record if a digital signature cannot be obtained from the reconstructed bar code;

m) attempting to verify the obtained digital signature; and o) creating suspect mailpiece record when the obtained digital signature cannot be verified.

13. The method of claim 12 wherein the suspect mailpiece record created in steps l and o include an assumed PSD-ID image of envelope, a reason for suspecting mailpiece and a date of record creation.

14. The method of claim 13 comprising the further step of:
p) Checking for mailpiece with a duplicate information-based indicium in a database.

15. The method of claim 12 wherein step f comprises the further step of:
1) flagging potential fraud when high quality print cannot be read.

16. The method of claim 12 wherein steps e and g comprise the further steps of
1) performing an initial check of indicia data for fraud;
2) verifying an indicium certificate for each mailpiece;
3) verifying the read digital signature; and
4) checking for mailpiece with a duplicate information-based indicium in a database.

17. A method for verifying information-based indicia printed on mailpieces, the method comprising the steps of:
a) initiating normal processing of the mailpieces;
b) detecting mailpieces with information-based indicia printed thereon;
c) scanning the information-based indicium on each of the detected mailpieces to read indicium data contained therein;

d) determining for each information-based indicium whether the indicium data is readable;

e) continuing normal processing when the indicium data is readable;

f) using a readable part of the indicium data attempting to obtain an unreadable part of the indicium data from other data sources;

g) attempting to reconstruct the information-based indicium by merging the readable part of the indicium data with the obtained unreadable part of the indicium data;

h) identifying the mailpiece as suspect if the merged data is insufficient;

i) attempting to verify a digital signature obtained from the reconstructed indicium;

k) returning to normal processing when the digital signature is verified; and l) identifying the mailpiece as suspect when the digital signature cannot be verified.

18. The method of claim 17 wherein the step f comprises the further steps of:
1) reading human readable information to obtain first information identifying a source of the indicium; and
2) using the first information to look up in a database second information that is included in the information-based indicium.

19. The method of claim 18 wherein the step f comprises the further steps of:
c) interpreting partial indicium data and extracting a best guess of the second information;
d) searching the database for the closest record matching the second information; and
e) merging data obtained from steps 2 and 4.

20. The method of claim 17 wherein the step f comprises the further steps of:
a) interpreting partial indicium data and extracting a best guess of second information; and
b) searching a database for the closest record matching the second information.

21. A method for verifying and information-based indicium comprising the steps of:
scanning the information-based indicium;
determining that the information-based indicium is readable only in part;
using a readable part of the information-based indicium to obtain an unreadable part of the information-based indicium from other data sources;
wherein the readable part of the information-based indicium is an identification of a postage metering device providing a certificate that is included in the information-based indicium, and wherein the unreadable part is the certificate.

22. The method of claim 21 comprising the further step of:
verifying a digital signature obtained from the information-based indicium using the obtained unreadable part of the information-based indicium.

23. A method for verifying and information-based indicium comprising the steps of:
scanning the information-based indicium;
determining that the information-based indicium is readable only in part;
using a readable part of the information-based indicium to obtain an unreadable part of the information-based indicium from other data sources;

obtaining human readable indicium data from the information-based indicium, said human readable indicium data including information specific to the information-based indicium;

using said specific information to determine a pointer that is used to obtain the unreadable part of the information-based indicium from the other data sources;

wherein the human readable indicium data is an origin zip code or and identification of a postage metering device providing a certificate that is included in the information-based indicium, and the unreadable part is the certificate.

24. The method of claim 23 comprising the further step of:

verifying a digital signature obtained from the information-based indicium using the obtained unreadable part of the information-based indicium.

* * * * *